United States Patent [19]
Chang et al.

[11] Patent Number: 5,759,059
[45] Date of Patent: Jun. 2, 1998

[54] MAU MOUNTING STRUCTURE

[75] Inventors: Yuh-Shuan Chang; Te-Wei Liu, both of Hsinchu, Taiwan

[73] Assignee: D-Link Corporation, Hsinchu, Taiwan

[21] Appl. No.: 725,818

[22] Filed: Oct. 7, 1996

[51] Int. Cl.⁶ ................................ H01R 13/629
[52] U.S. Cl. .................... 439/374; 439/928.1
[58] Field of Search ................ 439/374, 928.1

[56] References Cited

U.S. PATENT DOCUMENTS

| 4,941,841 | 7/1990 | Darden et al. | 439/374 |
| 5,187,643 | 2/1993 | I-Shou | 439/928.1 |

*Primary Examiner*—Gary F. Paumen
*Attorney, Agent, or Firm*—Jacobson, Price, Holman & Stern, PLLC

[57] ABSTRACT

A MAU mounting structure including a network device mainframe having a slot at one side and an electric connector inside the slot, a mounting case slidably mounted in the slot of the mainframe, having a top recess and two retaining notches at the back side and two curved finger strips bilaterally disposed at the front side for pulling with the hand, and a multi-station access unit mounted within the mounting case, the multi-station access unit having an electric connector supported on the top recess of the mounting case and adapted for connecting to the electric socket of the network device mainframe, two fastening devices disposed at two opposite sides of the electric connector of the multi-station access unit and adapted for securing the multi-station access unit to the mounting case, the fastening devices having a respective neck adapted for coupling to the retaining notches of the mounting case.

6 Claims, 2 Drawing Sheets

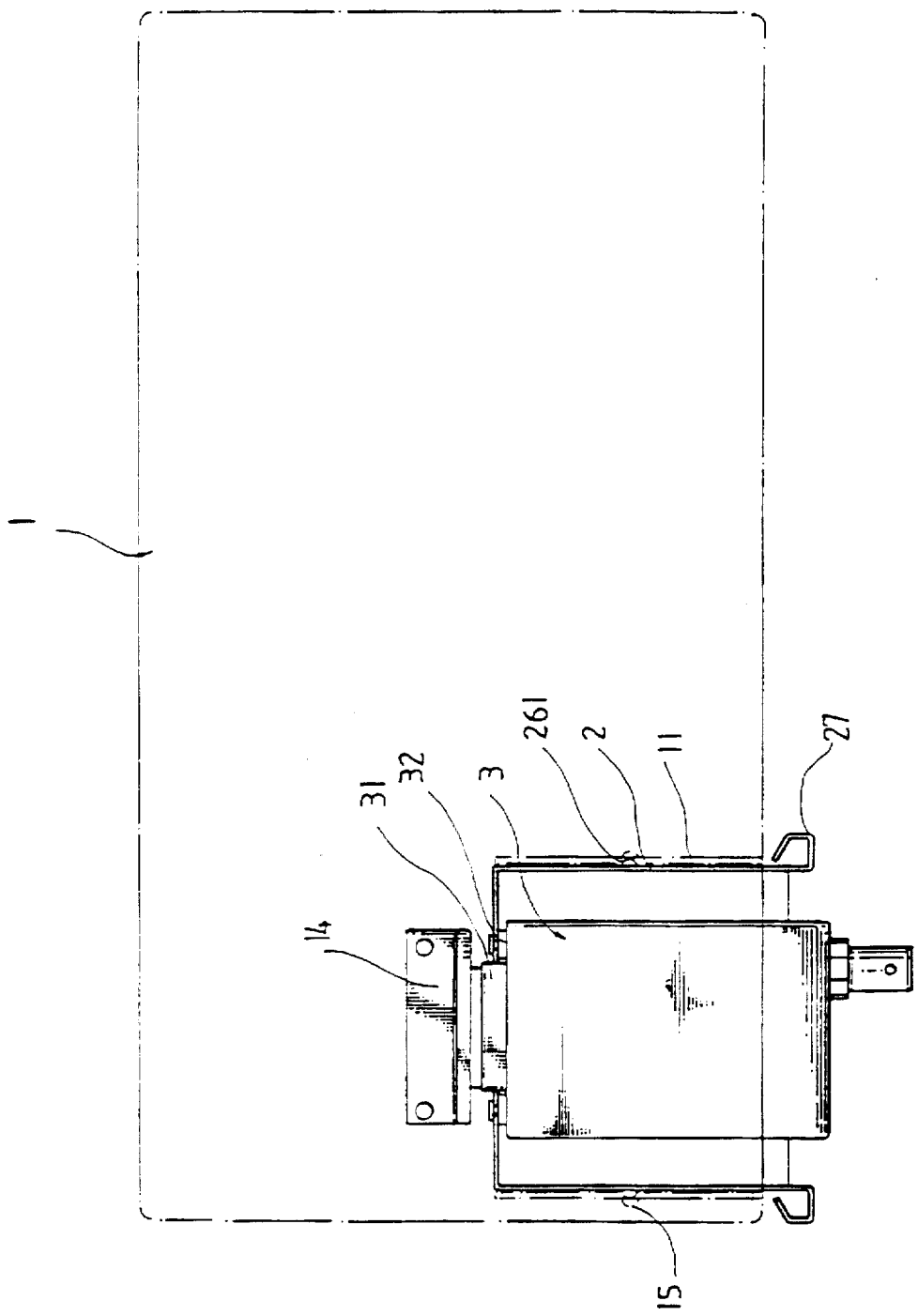

MAU MOUNTING STRUCTURE

BACKGROUND OF THE INVENTION

The present invention relates to a MAU (multi-station access unit) mounting structure, which comprises a mounting case adapted for mounting in a network device (for example a hub) to hold a MAU in electric connection with the network device.

Conventionally, the installation of a MAU (multi-station access unit) in a network device for example a hub or bridge connector is achieved by directly fixing the MAU to the mainframe of the network device on the outside by screws. Because the MAU is disposed outside the network device when installed, it destroys the sense of beauty of the network device and increases the possibility of being hit by foreign object and greatly increases the installation space of the network device.

SUMMARY OF THE INVENTION

The present invention has been accomplished to provide a MAU mounting structure which eliminates the aforesaid drawbacks. According to one aspect of the present invention, the MAU mounting structure comprises a network device mainframe having a slot at one side and an electric connector inside the slot, a mounting case slidably mounted in the slot of the mainframe and having a top recess and two retaining notches at the back side, and a multi-station access unit mounted within the mounting case, the multi-station access unit having an electric connector supported on the top recess of the mounting case and adapted for connecting to the electric socket of the network device mainframe, two fastening devices disposed at two opposite sides of the electric connector of the multi-station access unit and adapted for securing the multi-station access unit to the mounting case, the fastening devices having a respective neck adapted for coupling to the retaining notches of the mounting case. According to another aspect of the present invention, the mounting case has two curved finger strips respectively extending from two opposite side walls thereof at the front side. The curved finger strips are stopped outside the network device mainframe when the mounting case is mounted inside the slot of the network device. The mounting case can be conveniently pushed into the inside of the slot of the network device mainframe and then pulled out of the slot, when the curved finger strips are squeezed inwards. According to another aspect of the present invention, the network device mainframe has two retaining means bilaterally disposed inside the slot; the mounting case has two retainer means at two opposite sides adapted for engaging the retaining means of the network device mainframe to secure the mainframe in place when the mainframe is installed in the slot of the network device mainframe. According to still another aspect of the present invention, the network device mainframe has a hinged cover panel adapted for closing/opening the slot.

DETAILED DESCRIPTION OF THE PREFERRED EMBODIMENT

Figure 1:
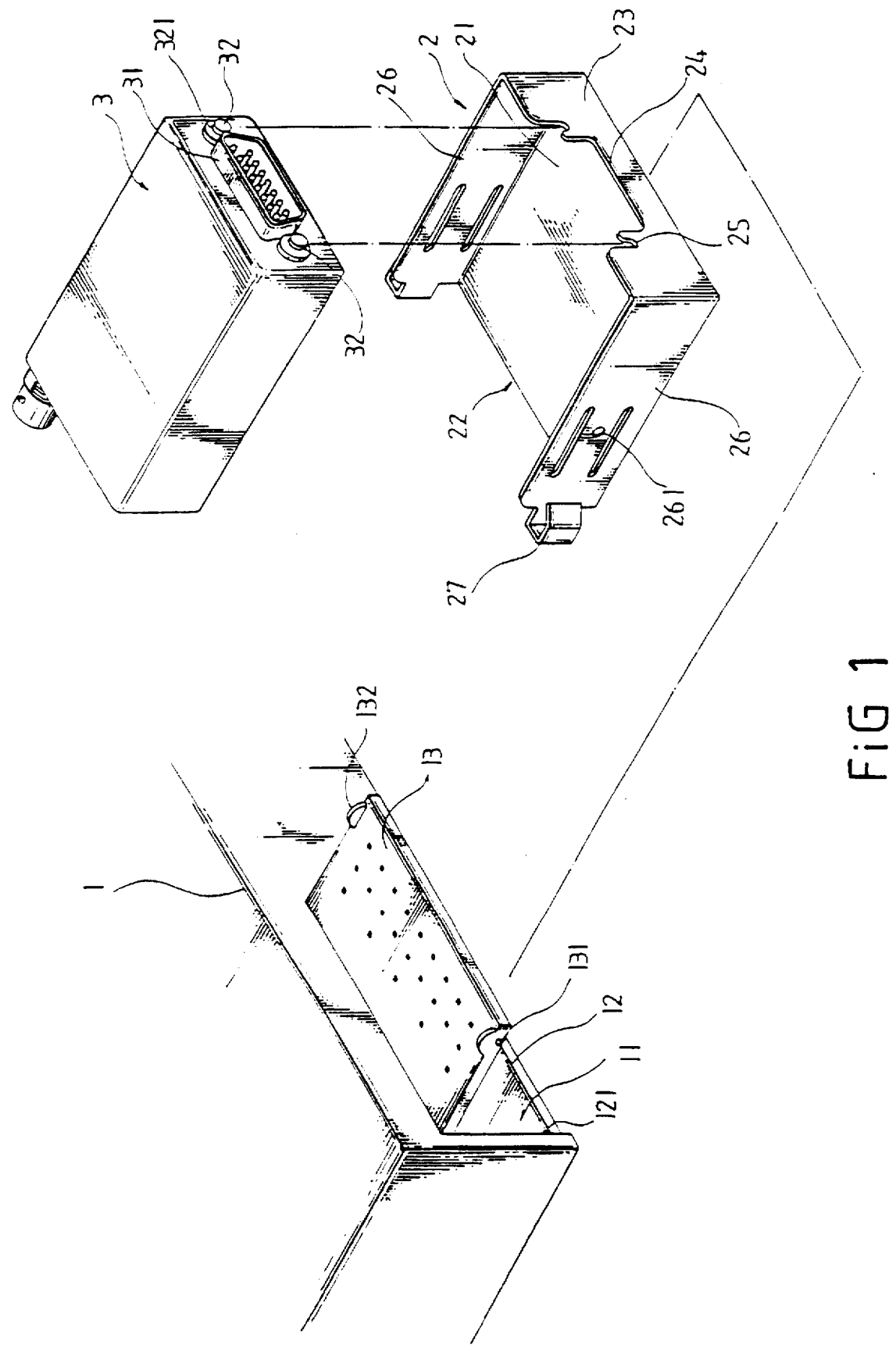
FIG. 1 is an exploded view of a MAU mounting structure according to the present invention; and, FIG. 2 is an installed view in section of the present invention, showing the MAU carried on the mounting case inside the slot of the network device mainframe, the electric plug of the MAU connected to the electric socket of the network device mainframe.

Referring to FIGS. 1 and 2, a MAU mounting structure in accordance with the present invention is generally comprised of a network device mainframe 1, a mounting case 2, and a MAU (multi-station access unit) 3.

The network device mainframe 1 can be the mainframe of any of a variety of network devices for example a hub, used in a computer network, comprising a slot 11 at one side, which has a mouth 12 at an outer side for communication with the outside, a cover panel 13 hinged to one side of the mouth 12 and adapted for closing/opening the slot 11, and an electrical connector for example an electric socket 14 disposed on the inside and facing the inner end of the slot 11.

The mounting case 2 is a rectangular frame adapted for mounting in the slot 11 of the mainframe 1, comprising a flat bottom wall 21, a front opening 22, an upright rear wall 23, and two upright side walls 26 bilaterally connected between the front opening 22 and the upright rear wall 23. The upright rear wall 23 has a top recess 24, and two top retaining notches 25 disposed at two opposite sides of the top recess 24.

The MAU 3 is mounted within the mounting case 2, comprising an electric connector for example an electric plug 31 at one end supported on the top recess 24 of the upright rear wall 23 of the mounting case 2 and adapted for connecting to the electric socket 14 of the mainframe 1, two fastening devices for example screw rods 32 disposed at two opposite sides of the electric plug 31 and adapted for securing the MAU 3 to the upright rear wall 23 of the mounting case 2. The screw rods 32 have a respective neck 321 adapted for coupling to the top retaining notches 25 of the upright rear wall 23 of the mounting case 2.

The cover panel 13 has two raised portions 131 at two opposite lateral sides, which are forced into engagement with respective recessed portions 121 inside the slot 12 of the mainframe 1 when the cover panel 13 is closed, and two handhold portions 132 at two opposite sides through which the cover panel 13 can be pulled outwards with the hands to disengage the raised portions 131 from the recessed portions 121, and to be moved from the close position to the open position for permitting the mounting case 2 to be moved in and out of the slot 11.

The mainframe 1 further comprises two retaining means for example to recessed holes 15 disposed at two opposite sides and spaced between the recessed portions 121 and the electric socket 14, and adapted for securing the mounting case 2 inside the slot 11.

The mounting case 2 further comprises two retainer means for example two stub rods 261 respectively raised from the upright side walls 26 on the outside and adapted for engaging the recessed holes 15 of the mainframe 1, and two curved finger strips 27 respectively extending outwards from the upright side walls 26 at one end adjacent to the front opening 22 and then bent inwards.

When in use, the MAU 3 is put in the mounting case 2, permitting the electric plug 31 to be supported on the top recess 24 of the upright rear wall 23 of the mounting case 2 and the necks 321 of the screw rods 32 to be respectively forced into engagement with the top notches 25 of the mounting case 2, then the cover panel 13 is opened, and then the mounting case 2 with the MAU 3 are put inside the slot 11, permitting the stub rods 261 of the mounting case 2 to be respectively forced into engagement with the respective recessed holes 15 of the mainframe 1 and the electric plug 31 of the mounting case 3 to be connected to the electric socket 14 of the mainframe 1. When the mounting case 2 is installed, the curved finger strips 27 of the mounting case 2 are stopped outside the mouth 12 of the slot 11 of the mainframe 1. When the curved finger strips 27 are squeezed inwards, the upright side walls 26 are forced inwards toward each other, causing the stub rods 261 to be disengaged from the recessed holes 15, for permitting the mounting case 2 to be pulled out of the slot 11 of the network device mainframe 1.

It is to be understood that the drawings are designed for purposes of illustration only, and are not intended as a definition of the limits and scope of the invention disclosed.

What the invention claimed is:

1. A MAU mounting structure comprising:

a network device mainframe having a slot at one side and an electric connector inside said slot;

a mounting case adapted for mounting in the slot of said network device, said mounting case comprising a bottom, a front opening, a rear wall, and two side walls bilaterally connected between said front opening and said rear wall, said rear wall having a top recess and two top retaining notches disposed at two opposite sides of said top recess; and a multi-station access unit mounted within said mounting case, said multi-station access unit comprising an electric connector supported on the top recess of the rear wall of said mounting case and adapted for connecting to the electric socket of said network device mainframe, two fastening devices disposed at two opposite sides of the electric connector of said multi-station access unit and adapted for securing said multi-station access unit to the rear wall of said mounting case, said fastening devices each having a neck adapted to be received in a respective top retaining notch of the rear wall of said mounting case.

2. The MAU mounting structure of claim 1 wherein said network device mainframe comprises two retaining means disposed at two opposite sides of said slot; said mounting case comprises two retainer means respectively disposed at the side walls thereof and adapted for fastening to the retaining means of said network device mainframe.

3. The MAU mounting structure of claim 2 wherein the two retaining means of said network device are recessed holes formed in said slot at two opposite sides.

4. The MAU mounting structure of claim 2 wherein the two retainer means of said mounting case are two stub rods respectively raised from said side walls at an outer side.

5. The MAU mounting structure of claim 1 wherein said network device mainframe comprises a hinged cover panel adapted for opening and closing said slot, said cover panel having two handhold portions at two opposite sides through which said cover panel can be turned with the hand to close or open said slot, and two raised portions adapted for engaging two recessed portions inside said slot to hold said cover panel in a closed position.

6. The MAU mounting structure of claim 1 wherein said mounting case has two curved finger strips respectively extending from said side walls at one end adjacent to the front opening of said mounting case, said curved finger strips being stopped outside said network device mainframe when said mounting case is mounted inside the slot of said network device mainframe.

* * * * *